Patented July 27, 1926.

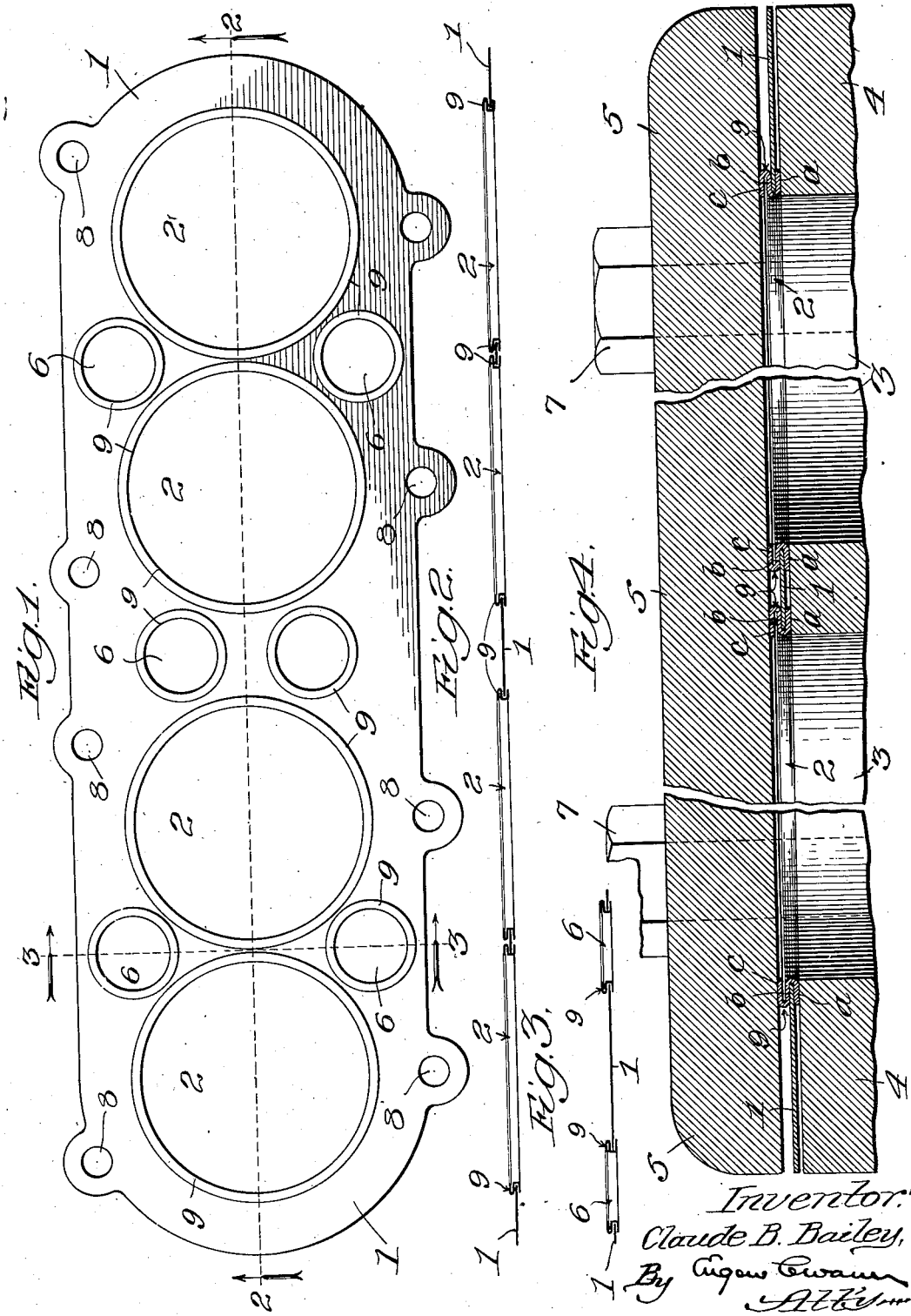

1,593,560

UNITED STATES PATENT OFFICE.

CLAUDE B. BAILEY, OF WYANDOTTE, MICHIGAN, ASSIGNOR TO McCORD RADIATOR & MFG. CO., OF DETROIT, MICHIGAN, A CORPORATION OF MAINE.

GASKET.

Application filed July 6, 1925. Serial No. 41,476.

The gasket contemplated by this invention has a plurality of spaced port holes in its body portion with the latter in the form of a single layer of sheet material and with folded pressure receiving rings about the respective port holes and made of sheet metal independently of the body layer and inserted in said port holes.

The invention consists further in having the margins of the port holes clamped between the flanges or folds of the pressure receiving rings to hold the latter on the gasket.

The invention consists further in the matters hereinafter described and claimed.

In the accompanying drawings—

Fig. 1 is a plan view of a cylinder head gasket constructed in accordance with my invention;

Figs. 2 and 3 are longitudinal and transverse sectional views, respectively, taken on lines 2—2 and 3—3 of Fig. 1; and Fig. 4 is a vertical sectional view showing the gasket clamped between a cylinder block and cylinder head.

As shown in the drawings, the gasket has a flat body portion 1 stamped or otherwise formed from a single layer of sheet metal, such as copper, brass, aluminum, zinc, or other suitable material. Said gasket has a plurality of relatively large port holes or openings 2, 2 disposed in a row lengthwise of the gasket body. Said port holes 2, 2 are substantially the same in size and arranged to fit about the cylinder bores 3, 3 in the cylinder block 4, against which the gasket is clamped by the cylinder head 5, as shown in Fig. 4. The body 1 is further provided with a plurality of smaller port holes 6, 6, also the same in size and arranged to fit about the registering water passages in the block 4 and head 5, respectively, as usual in water cooled gas engines. When the gasket is clamped between such parts by the usual studs or bolts 7, 7, as in structures of this kind, the gasket has holes 8, 8 at its margins to receive these studs.

The gasket shown in the drawings is designed for use with a four cylinder engine with overhead valves, the latter being omitted for the sake of illustration. Such engines are employed in Chevrolet cars, although it is of course to be understood that gaskets of my invention may be designed for the same number or more cylinder motors and with different valve arrangements, without departing from the spirit and scope of my invention.

Around the port holes 2 and 6, I provide pressure receiving portions 9, 9 formed of sheet metal independent of the gasket body 1 and inserted in said port holes. These portions are in folded form and have a plurality of superimposed folds or layers $a$, $b$, and $c$, as clearly shown in Fig. 4. These layers are substantially parallel to each other and to the gasket body 1 and are slightly spaced apart with a portion of the gasket body about the port holes fitting between the layers $a$ and $b$, as shown. The fold in the metal between the layers $a$ and $b$ surrounds and covers the inner edges of the respective port holes and prevents leakage between the body 1 and the layers $a$ and $b$ on opposite sides thereof. The fold in the metal between the layers $b$ and $c$ is around the outer edge of the member 9 and prevents leakage between the flanges $b$ and $c$. It is preferable to have the metal forming the members 9 under slight tension so as to yield under clamping pressure for the purpose of producing tight joints.

The portions 9 extends outward from the plane of the body 1 and are relatively narrow in width as compared to the width of the body. Said portions 9, by reason of their folding, are thicker than the body and allow the clamping pressure when exerted on the gasket to be concentrated on and confined to these portions 9 to obtain tight joints immediately at the port holes, without distributing and wasting the pressure over the entire surface or area of the gasket, as with cylinder head gaskets as heretofore generally constructed. This allows less pressure to be used and thus enables smaller studs or bolts to be employed, or the same size studs as now generally employed may be used with less strain or tension on them to provide tight joints, especially for high pressures as encountered in the cylinders of internal combustion engines.

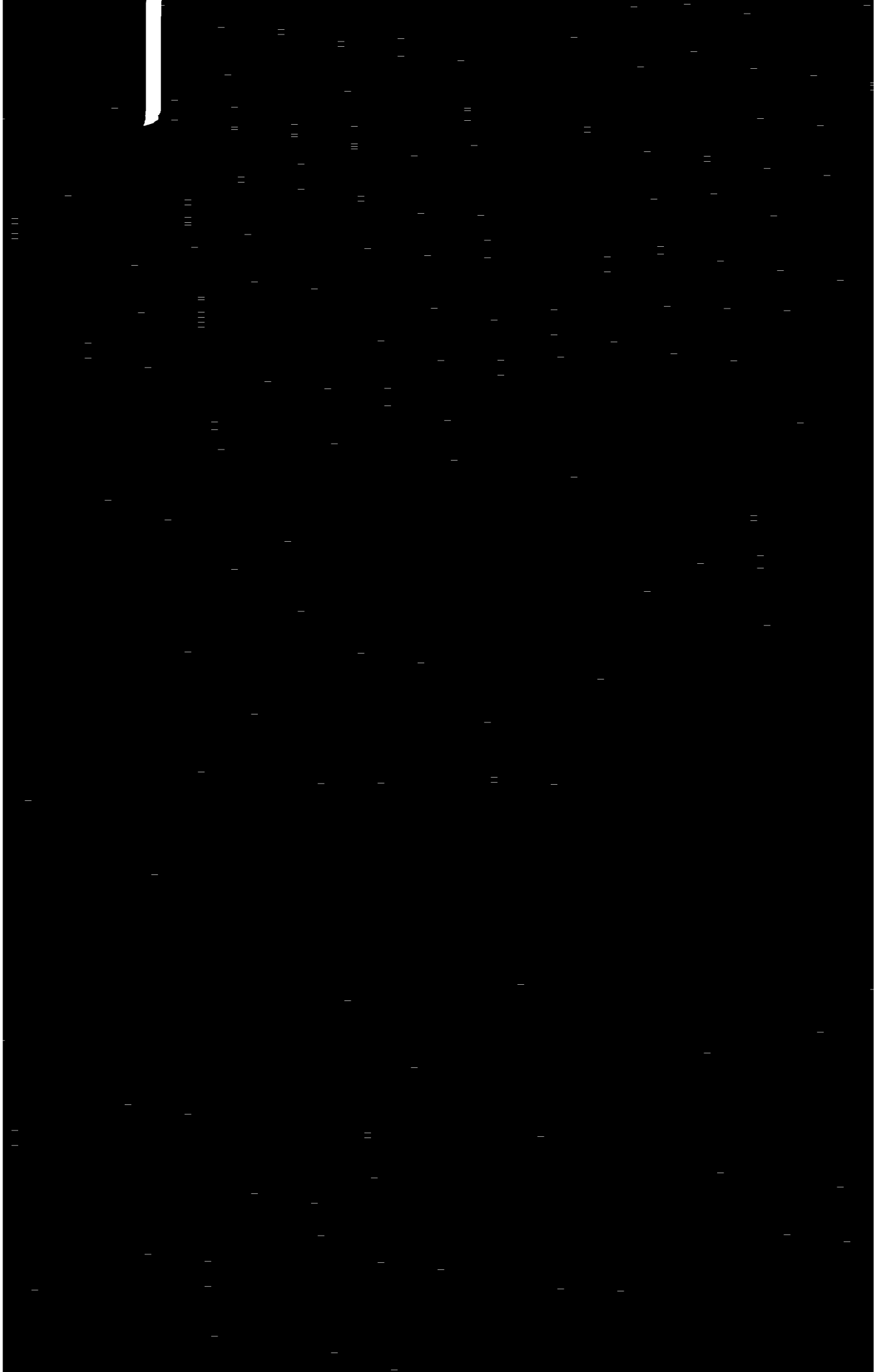

With the folds arranged parallel to the gasket body, flat seating surfaces are provided by the members 9, and moreover the members yield to clamping pressures for maintaining tight joints. The gaskets being made entirely of sheet metal, avoids blow-outs for the reason that there are no separate parts in the gasket structure to